United States Patent [19]

Loniello

[11] Patent Number: 4,879,902

[45] Date of Patent: Nov. 14, 1989

[54] LEVEL CONTROL STRUCTURE WITH PROBES

[75] Inventor: Peter J. Loniello, Richfield, Minn.

[73] Assignee: DRI Steem Humidifier Co., Hopkins, Minn.

[21] Appl. No.: 231,715

[22] Filed: Aug. 12, 1988

[51] Int. Cl.⁴ .................. G01F 23/24; G01F 23/00
[52] U.S. Cl. .................. 73/304 R; 73/304 C; 340/620; 137/392
[58] Field of Search ............ 73/304 R, 304 C; 137/392; 340/620

[56] References Cited

U.S. PATENT DOCUMENTS

| | | | |
|---|---|---|---|
| 1,978,392 | 10/1934 | Brockdorff | 73/304 R |
| 2,511,649 | 6/1950 | Reiter | 340/620 |
| 3,339,411 | 9/1967 | Riffie | 73/304 R |
| 3,504,205 | 3/1970 | Sheckler | 340/620 |
| 3,510,836 | 5/1970 | Summerer | 340/620 |
| 3,534,352 | 10/1970 | Gallagher | 340/620 |
| 3,831,069 | 8/1974 | Merrell et al. | 73/304 C |
| 4,027,172 | 5/1977 | Hamelink | 340/620 |
| 4,056,978 | 11/1977 | Zimmermann | 73/304 R |
| 4,549,245 | 10/1985 | Fleckenstein | 73/304 C |

FOREIGN PATENT DOCUMENTS

| | | | |
|---|---|---|---|
| 1524024 | 9/1978 | United Kingdom | 73/304 R |
| 2127976A | 4/1984 | United Kingdom | 73/304 R |

Primary Examiner—William A. Cuchlinski, Jr.
Assistant Examiner—Diego F. F. Gutierrez
Attorney, Agent, or Firm—Kinney & Lange

[57] ABSTRACT

An electronic level control structure for regulating a fluid level in a vessel, such as a humidifier tank. The electronic level control has at least two Teflon ® coated probes for sensing fluid level in the tank and extending downwardly from a main body member. A downwardly extending sleeve positions about a portion of the upper regions of each of the probes. The Teflon ® coating and the sleeve at the upper region of each probe inhibits the formation of scale between the probes at the upper end of each probe by preventing or minimizing the amount of contact by vaporous gases, mineral salts and other contaminants about the upper regions of each probe. This also prevents buildup of electrical conductive scale. In one embodiment, three probes of different lengths extend downwardly from a body member.

7 Claims, 3 Drawing Sheets

LEVEL CONTROL STRUCTURE WITH PROBES

BACKGROUND OF THE INVENTION

1. Field of the Invention

The present invention relates to a fluid level control structure, and more particularly, pertains to an electronic level control structure with scale inhibiting sleeves about the upper portion of each of the TEFLON ® coated probe rods.

2. Description of the Prior Art

Level sensing and control probe structures in a humidifier tank in the prior art often suffered from a buildup of scale, such as electrical conductive mineral deposits, between the upper portions of the probe rods. The probe rods also deteriorated due to particle buildup along the length of the probes. A buildup of electrically conductive scale at the upper portion of the sensor rods results in inaccurate electrical control signals.

The present invention overcomes the disadvantages of the prior art devices by providing a level control structure with sensor rods which are TEFLON ® coated, and which include a sleeve about the upper portion of each sensor rod, consequently inhibiting scale build up which produces inaccurate level measurement readings.

SUMMARY OF THE INVENTION

The general purpose of the present invention is to provide an electronic level control structure which prevents scale buildup about the upper portions of the probe rods by coating the rods with TEFLON ® and by having protective sleeves about the upper portions of each of the probe rods.

One embodiment of the present invention discloses an electronic level control probe assembly with a housing. At least one TEFLON ® coated probe rod extends from a main body member and through protective sleeves. One end of the probe rod is exposed to differing fluid levels, and the other end is secured in a threaded insertion of a main body member. A sleeve extends downwardly about each probe from the body member to prevent the buildup of electrical conductive scale.

DESCRIPTION OF THE PREFERRED EMBODIMENTS

Figure 1:
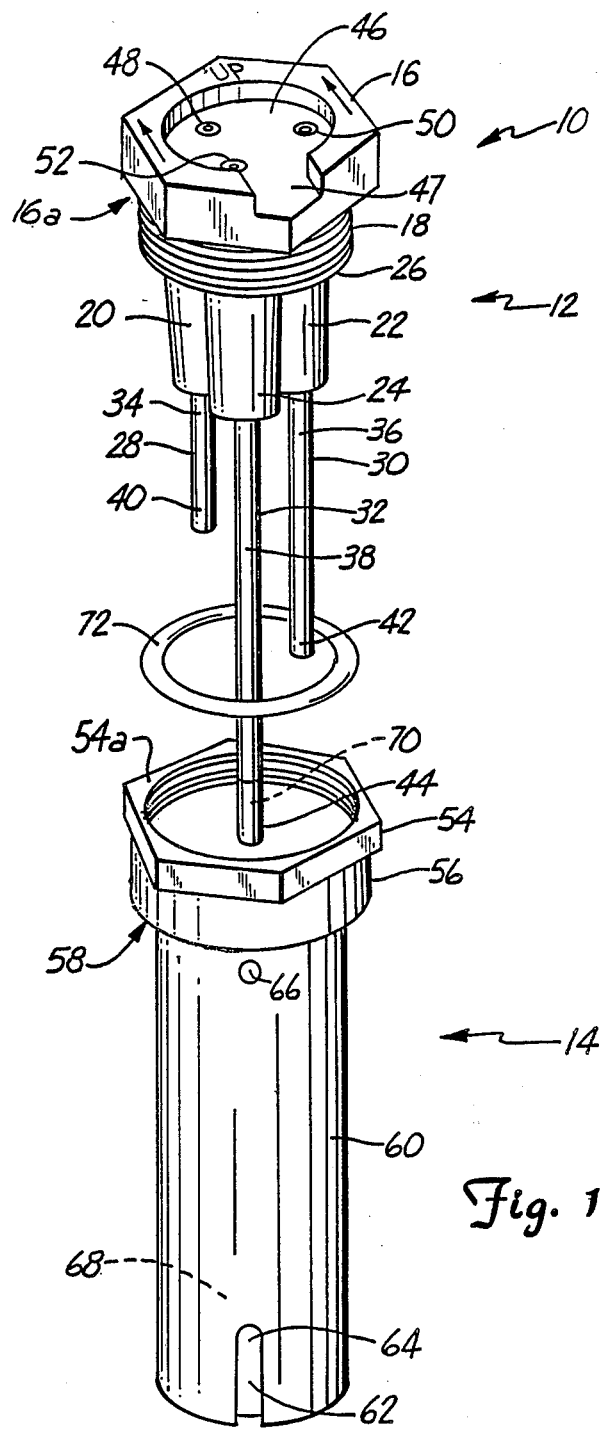
FIG. 1 is a perspective view of the electronic level control.

FIG. 1 illustrates a perspective view of an electronic level control structure 10 including a probe assembly 12 and a probe assembly housing 14 which surrounds the probe assembly 12. The probe assembly 12 includes a hexagonally shaped main body member 16, a threaded member 18 extending downwardly from the hexagonally shaped body member 16, at least two sleeves, including sleeves 20, 22, 24, extending perpendicularly and downwardly from the lower surface 26 of the threaded member 18, and atleast two metal probe rods 28, 30, 32 which extend from, within and are concentric to the sleeves 20, 22, 24. Each of the probes 28, 30, 32 are removable and are partially coated with a heavy TEFLON ® fluorocarbon coating 34, 36, 38 respectively, preferably in the range of 5mil thickness by way of example, and not to be construed as limiting, leaving probe ends 40, 42, 44 electrically exposed. Any suitable non-stick material can be utilized including fluorocarbon derivatives. The TEFLON ® coating can be of a thickness in the range of 1–10 mil. The probe rods 28, 30, 32 are each of a different length. A contactor cavity 46 in the hexagonal main body member 16 accommodates an external contactor for connection to external control circuitry and includes a connector cable receiving channel 47, and cylindrical metallic inserts 48, 50, 52 with threaded inner lower portions illustrated in FIG. 3 which engage threads on the probes 28, 30, 32, respectively. The upper inner portion of the cylindrical inserts are smooth to accept a conventional male type connector pin on an external contactor device such as a banana plug assembly.

The one-piece probe assembly housing 14 is cylindrical and includes an upper hexagonal member 54, a cylindrical member 56 extending from the hexagonal member 54, and a horizontally aligned annular mounting stop surface 58 extending inwardly from the lower region of the cylindrical member 56 to intersect a tapered cylindrical member 60. The cylindrical member 60 tapers towards its lower region and includes a bottom 62. The tapered cylindrical member 60 includes a slotted hole 64 for fluid entry into the probe assembly housing and also includes pressure relief hole 66 in the upper top region. Another slotted hole 68 and a pressure relief hole 70 are also located on the opposite side in diametrical opposition to those shown, but are not illustrated for the purpose of brevity and clarity. The probe assembly housing 14 acts as a buffer for more constant level control sensing, and also inhibits contact of vaporous gases or salts with the upper portion of the probes 28, 30, 32. A sealing washer 72 is positioned between the lower surface 16a of the upper hexagonal main body member 16 and the upper surface 54A of the upper hexagonal member 54.

Figure 2:
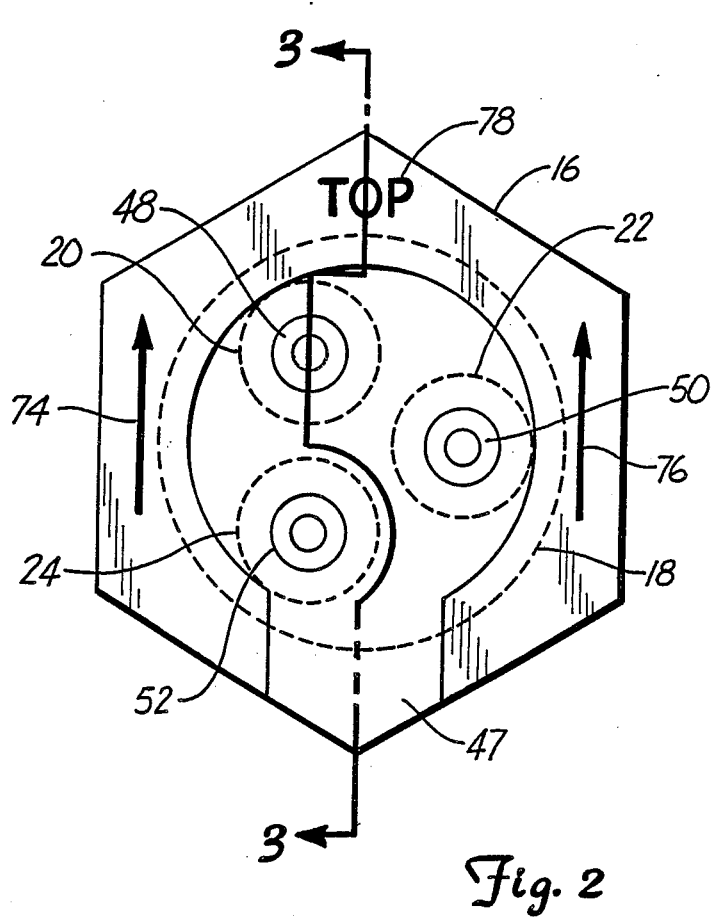
FIG. 2 is a top view of the probe assembly.

FIG. 2 illustrates a top view of the probe assembly 12 where all numeral correspond to those elements previously described. Orientation arrows 74 and 76, and a "TOP" label 78 provide for proper orientation of the electronic level control 10 on installation.

Figure 3:
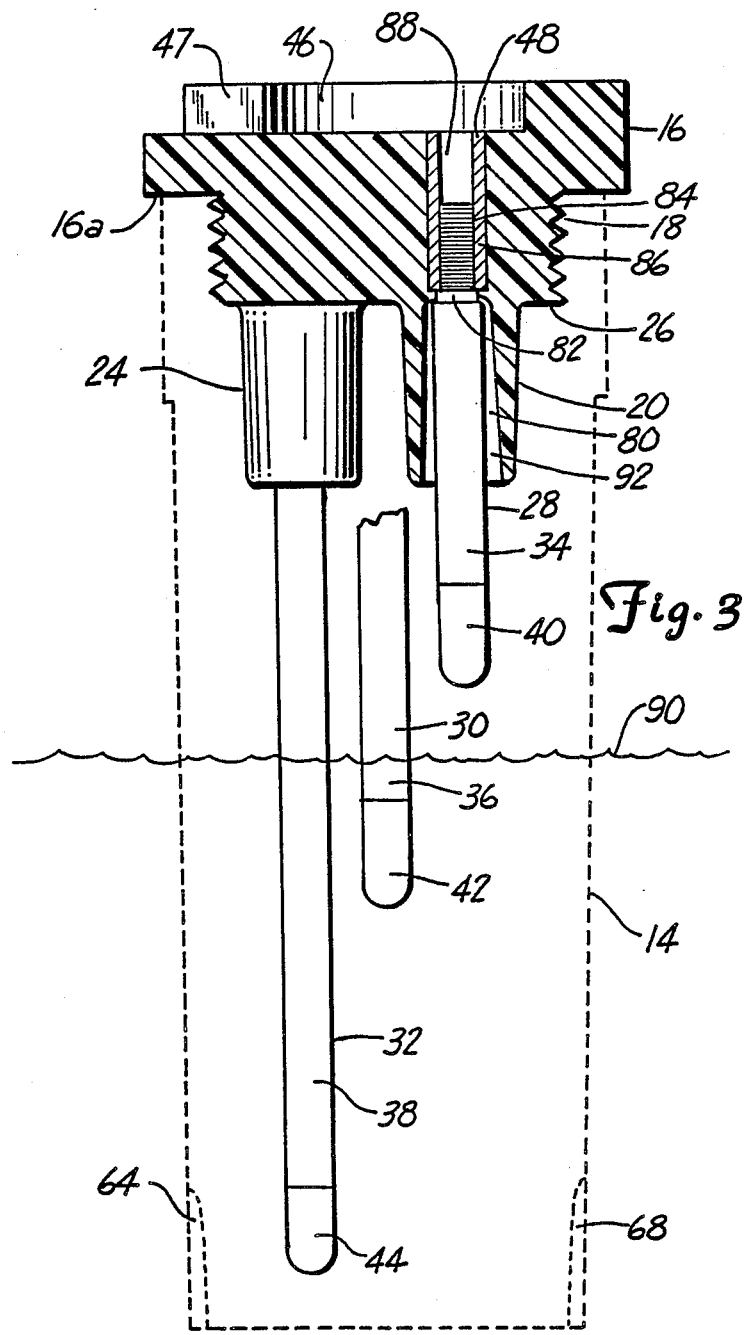
FIG. 3 is an elevational view in cross-section taken along line 3—3 of FIG. 2.

FIG. 3 illustrates a view of cross section taken along line 3—3 of FIG. 2 where all numerals corespond to those elements previously described. The illustrated sleeve 20, similar in all respects to sleeves 22, 24, defines a cylindrically shaped cavity 80 providing a space between the inner wall of the sleeve and the outer surface of the probes. A body hole 82 aligns vertically at the inner upper end of the cavity 80. Threads 84 on the end of the probe rod 28 engage the threads 86 of the metal cylindrical insert 48. The smooth cylindrically shaped inner surface 88 slidably receives an external connector pin, such as a connector pin of a banana plug assembly, and continuity exists from the metal cylindrical insert 48, through threads 84 of the probe rod 28, and through the TEFLON ® coated main body of the probe rod 28 to the exosed probe end 40. Each of the cylindrical metallic inserts 48, 50 and 52 has a smooth interior surface bore 88 for receiving connector pins of a banana plug assembly.

FIG. 3 best illustrates one mode of operation. Metal probe rods 28, 30, 32 extend downardly into a fluid 90 whose level is to be controlled. The fluid can be in a humidifier tank. The tapered probe assembly housing 14 is shown in dashed lines and serves as a buffer between the fluid and the probes 28, 30, 32. Fluid enters in the slotted holes 64, 68 described in FIG. 1. The exposed end 44 of the metal probe rod 32 acts as a common or ground probe. The exposed end 42 of the metal probe 30 along with exposed end 44 of probe rod 32 senses an appropriate tank level. When the level of fluid 90 is below the exposed probe end 42, a "low" tank level is sensed when only the common or ground probe 32 is in the fluid 90. Fluid is allowed to rise via external control devised until contacting the exposed end 40 of the metal probe 28, and a "full" tank is sensed in cooperation with the common metal probe 32. External electrical circuitry control the fluid levels as sensed by probes 28, 30, 32. A plug connector assembly and an external electrical circuitry are not illustrated for the sake of brevity in the drawings.

The TEFLON ® or like coatings 34–38 are in the range of 1–10 mil thick on probes 28–32 which are preferrably in the range of five mils thick. The coating impedes probe deterioration along the length of each probe and from probe to probe. The sleeves 20–24 surrounding the upper ends of the metal probe rods 28–32 prevent buildup of electrical conductive scale from forming between the upper ends of the metal probe rods 28–32 by providing a barrier interposed between each upper end of the metal probe rods 28–32. Vapors are prevented from contacting the surface 26 adjacent the locations of the threads 84 of each metal probe rods screw into the metal cylindrical insert 48 which can be electrically exposed and contaminated by vapors, and by the electrolysis effect wherein scale and other residues are formed between different probe elements and their attachment portions. Heated vapors containing salts and minerals are prevented from reaching the upper probe rod ends by direct physical intervention of the sleeves 20–24 and by a barrier of non-circulatory air 92 in the cylindrically shaped cavity 80 in each of the sleeves 20–24.

Various modifications can be made to the present invention without departing from the apparent scope hereof. The sensing probes may be metallic or other like electrically conductive material, and may or may not be coated with an insulating or like material.

What is claimed is:

1. A level control structure comprising a probe assembly body member; at least one metallic cylindrical insert extending through said body member; a metallic sensing probe connected to said insert and extending outwardly from the body member; and a sleeve extending from said body member and about said probe for protecting a portion of said probe adjacent said body member, said sleeve being spaced from said probe along a selected distance of the length of the probe.

2. The level control structure of claim 1 wherein the sleeve has an interior cavity that tapers to become larger in direction away from the body member.

3. The level control structure of claim 1 wherein the interior of said sleeve forms a conical cavity enlarging in direction away from the body member.

4. A level control structure comprising a probe assembly body member for use in a humidifier having a water level including a main body member, a contactor cavity therein, and a threaded member extending downwardly therefrom; a plurality of metallic inserts extending from said cavity and through to a bottom of said threaded member; a sensing probe engaged into each of said inserts; and a separate sleeve extending downwardly from said threaded member and circumscribed about each said probe and spaced therefrom for forming a cavity and protecting an upper portion of its respective probe and preventing scale from evaporating water from building up around the exposed ends of the inserts.

5. A level control structure for a humidifier tank comprising a probe assembly body member including a main body member, having means for attaching the main body member to a humidifier tank extending downwardly from an upper end thereof; a plurality of metallic inserts extending from the upper end through to a bottom of said main body member; a plurality of metallic sensing probes of different lengths, one each of said inserts; and a plurality of sleeves integral with the bottom of the main body member extending downwardly from said main body member and each sleeve surrounding and being spaced from an upper portion of one of said probes for protecting such upper portion of the respective probe.

6. The level control structure as specified in claim 5 wherein each of said probes is partially coated with a material having a low coefficient of friction.

7. The level control structure as specified in claim 6 wherein said material is a fluorocarbon.

* * * * *